Patented Jan. 8, 1929.

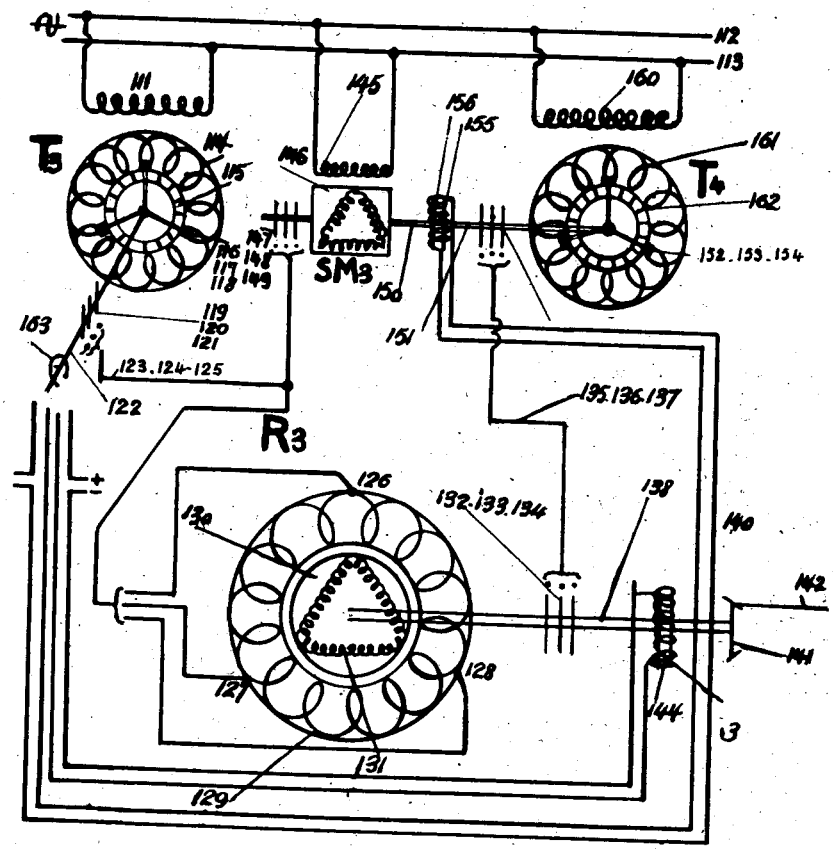

1,697,976

UNITED STATES PATENT OFFICE.

ELIE GRANAT, OF PARIS, FRANCE, ASSIGNOR OF ONE-HALF TO COMPAGNIE DES FORGES ET ACIERIES DE LA MARINE ET D'HOMECOURT, OF PARIS, FRANCE, A COMPANY OF FRANCE.

DISCONNECTING AND RECONNECTING DEVICE FOR DISTANT-CONTROL ARRANGEMENTS.

Application filed August 2, 1927, Serial No. 210,101, and in France September 28, 1926.

My application Ser. No. 56,380 described a control transmission working through the phase or frequency variations of a polyphase current feeding the receiver, the phase or frequency variation being obtained by a rotation of movable brushes through which the said current passes and rubbing on a commutator of a distant control device transmitter; this transmitter may be as well a dynamic transmitter as described in the said application or a static transmitter as described in application Serial No. 142,448. Such a transmission is particularly applicable to the control of ordnance from a distance. In this case as well as in other cases where the controlled part can move only between certain limits it may be desired to allow the transmitter to rotate continuously, the receiver stopping when it arrives at the position corresponding to the end of the path of the part (ordnance for instance) controlled by it. In such a case when the transmitter returns into the zone corresponding to the angular zone of movement of the controlled part, the latter should fall back again under the control of the transmitter.

The present invention has for its objects an automatic disconnecting and reconnecting device for the receiver applicable to all known D. C. or A. C. electric control transmissions, particularly to a control transmission working according to the above mentioned applications, the disconnection and the reconnection being provided when the controlling part of the distant control transmitter passes beyond and returns in front of a stop corresponding to the extreme position which it is desired to give to the controlled part actuated by the receiver. The latter comprises, as in the abovementioned application Serial No. 56,380 two windings: the first of these is fed with the polyphase distant control current and the second with a current producing a field stationary or rotating at the same speed as that of the distant control current according as to whether the transmitter is or not in the angular zone corresponding to the angular zone allowed for the movement of the controlled part. In view of this the controlling part at the transmitting station, when it passes in front of the abovementioned stop corresponding to the limit of this zone, controls the circuit of an electromagnetic clutch device in such a manner as to cause as explained hereunder, the abovementioned field to be stationary or not according to the position of the controlling part with reference to the stop; a second electromagnetic clutch may be inserted in the mechanical transmission connecting the receiver with the controlled part and be controlled in a similar manner so that not only the receiver will be stopped at the desired moment, but also the controlled part will no longer be connected with it.

The control of the field of the second winding of the receiver by the first electromagnetic clutch may be made by way of example and by no means exclusively in the following manner: An auxiliary motor controlled by the transmitter in the same manner as the receiver, controls one of the pinions of a differential the planet pinions of which control (mechanically or through a control transmission) the movable brushes feeding the second winding of the receiver. The other pinion of the differential moves together with the first pinion or remains stationary according as to whether the electromagnetic clutch is excited or not. Thus the brushes are stationary or rotate under the action of the auxiliary motor and thereby the field produced by the second winding of the receiver is stationary or not according to the position of the transmitter controlling part with reference to the stop. According as to whether it is or not in the zone coresponding to that allowed for the movement of the controlled part, the receiver will rotate under the influence of the action of the stationary field on the rotating field of the distant control current or else will remain stationary, the two fields rotating at the same speed in the same direction.

In another form of execution, the second winding of the receiver is also fed with the polyphase current of the distant control the frequency of which is modified with reference to the current feeding the first winding by means of an intermediary auxiliary motor controlled by the distant control device and actuating the movable brushes of a frequency changer. This frequency changer is provided with a commutator the winding of which is fed by a shunt of the distant control current passing through the said movable brushes, the second winding of the receiver being fed through normally stationary brushes rubbing on the same commutator of the frequency changer; thus the field produced in the receiver by the current passing through the frequency changer is normally stationary by reason of the compensation of the rotation of the brushes of the distant control transmitter by that of the movable brushes of the frequency changer controlled by the auxiliary motor. But when the controlling part at the transmitting station has passed beyond the stop, it causes the fields of both windings of the receiver to rotate at the same speed whereby the receiver is stopped through the rotation of the normally stationary brushes of the frequency changer at the same speed as the rotating brushes thereof; this is obtained by the action of the auxiliary motor which controls these normally stationary brushes through the electromagnetic clutch which in this case is excited when the controlling part has passed beyond its stop and is no more so when it is to the front thereof.

In this last form of execution the frequency changer may be replaced by a secondary transmitter one winding of which is fed by the mains and the second winding sends through normally stationary brushes current into the second winding of the receiver which current produces normally a stationary field in this last winding. This field under the action of the movable field of the first winding of the receiver ensures thus the controlled rotation of the latter. The normally stationary brushes are actuated as precedently by the auxiliary motor through the electromagnetic clutch when it is required to ensure the rotation of the two fields of the receiver with a view to stopping the said receiver.

On appended drawings given by way of example:

Fig. 4 is a modified form of Fig. 3 wherein the frequency changer is replaced by an intermediary transmitter one winding of which is fed from the mains.

Figure 1:
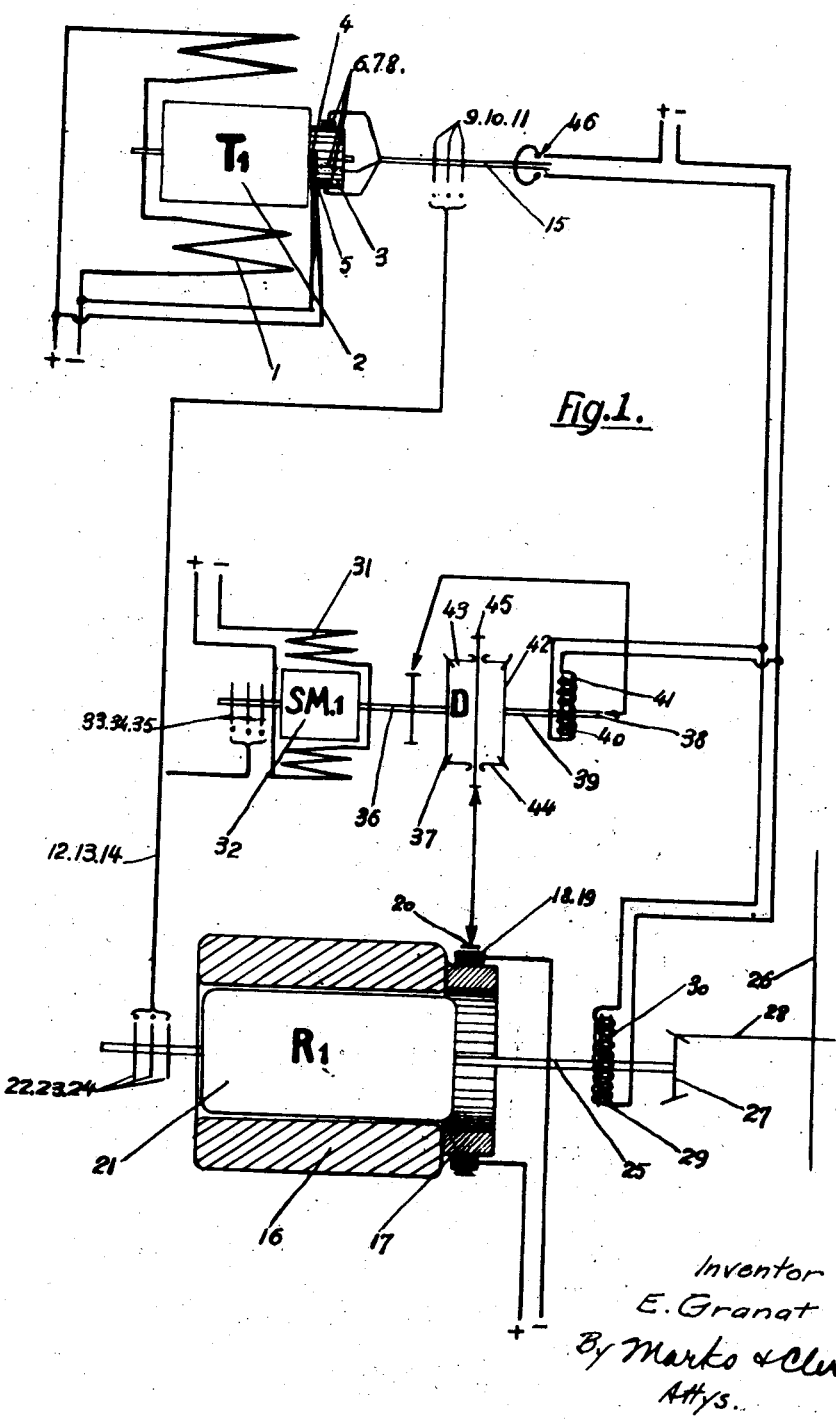
Fig. 1 shows a distant control device where the receiver and the controlled part are caused to be disconnected and reconnected at the end of the path through a mechanical differential which controls directly the feed brushes of one of the windings of the receiver.

On Fig. 1 the transmitter $T_1$ of the distant control device has its field piece 1 fed with D. C. for instance; its armature 2 is provided with a commutator 3 fed through two brushes 4, 5. The three-phase current for distant control is collected by the three movable brushes 6, 7, 8 rubbing on the commutator 3 and connected with the rings 9, 10, 11 and with the three line wires 12, 13, 14; the controlling part causes the shaft 15 of this brush set to rotate. The receiver $R_1$ comprises a stator 16 the sections of the distributed winding of which are connected with the commutator segments 17; on this commutator rub two brushes 18 and 19 fed with D. C. These brushes are normally stationary but are disposed so as to be able to rotate with their holder 20 as explained hereinafter. The three-phase rotor 21 of the receiver is connected with the feed wires 12, 13, 14 through the contacts sliding on the rings 22, 23, 24; the controlled part is driven by the shaft 25 of the rotor connected with the shaft 26 of the controlled part through the conical pinions 27, 28 and the electromagnetic clutch 29 excited by the winding 30 fed with D. C. when the contact 46 is closed, this closing being provided by the passing of the controlling part in front of the stop corresponding to the extreme position allowed the controlled part.

The device comprises further a synchronous auxiliary motor $SM_1$ provided with a field piece 31 fed with D. C. and a three-phase rotor 32 bearing three rings 33, 34, 35 fed through the distant control transmission 12, 13, 14. The shaft 36 of this auxiliary motor drives the conical pinion 37 of the differential D the second pinion 42 of which is driven by the same shaft 36 through mechanical connections shown diagrammatically, the shaft 38, the electromagnetic clutch 40 and the shaft 39. The exciting winding 41 of the electromagnetic clutch 40 is excited together with the winding 30 when the contact 46 is closed. The set of planetary pinions 43, 44 of the differential D drives a pinion 45 controlling mechanically the set of movable brushes 20 of the stator of the receiver.

The working of this distant control device is the following: The controlling part being stopped in any position, the receiver and auxiliary motor are both stationary.

When the controlling part moves in the zone corresponding to the closing of the contact 46 and thereby to the zone allowed for the displacement of the controlled part, the rotation of the set of brushes 6, 7, 8 produces in the rotors of the receiver and of the auxiliary motor rotating fields which cause the receiver and auxiliary motor to rotate; the latter controls in opposite directions the two pinions 37 and 42 of the differential D as the electromagnetic clutch is excited. Therefore the set of pinions 43, 44 and the set of brushes 18, 19 are motionless; the receiver keeps being controlled by the transmitter and controls the controlled part.

On the other hand if the controlling part passes beyond the zone corresponding to that allowed for the movements of the controlled part, it opens the contact stop 46 when passing in front of it, whereby the connection between the receiver and the controlled part is broken as well as that between the auxiliary motor and the pinion 42. By reason of the rotation of the pinion 37 and of the immobility of the pinion 42, the planet pinions begin rotating and cause the brushes 18, 19 to rotate at the same speed and in the same direction as the rotating field of the rotor; the stator field rotates also at the same speed and in the same direction as the latter whereby any rotation of the receiver is prevented. The receiver remains motionless as long as the controlling part remains outside the zone corresponding to the allowed displacement of the controlled part; on the other hand, as soon as the controlling part passes in front of the contact stop 46, it closes again the circuits of the two clutches: the brushes 18, 19 cease rotating and the receiver rotates and drives along with it, the controlled part.

Figure 2:
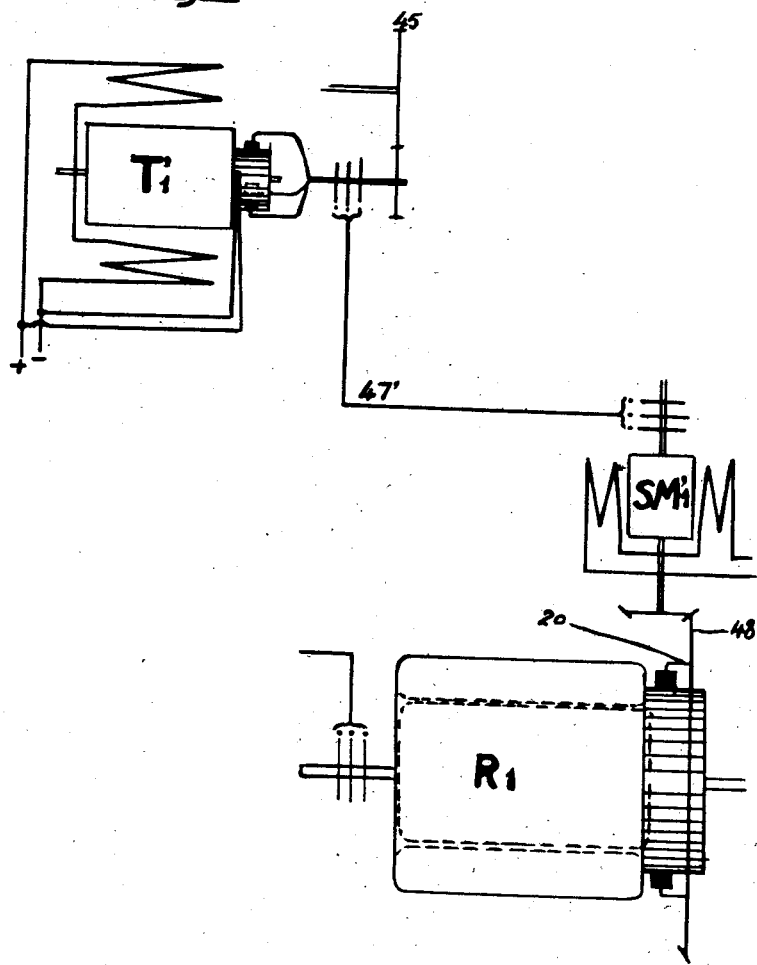
Fig. 2 is a modified form of this device wherein the mechanical differential controls through an electric distant control device the feed brushes of the receiver.

On Fig. 2 is shown a modified form of the control of the movable brushes 18, 19 by the pinion 45 controlled by the planet pinions of the differential D. In this modified form which allows the auxiliary motor to be disposed at a distance from the receiver, the pinion 45 controls the set of movable brushes of a transmitter $T'_1$ similar for instance to the transmitter $T_1$; the polyphase current collected by these movable brushes feeds through the transmission 47' the armature of an auxiliary motor $SM'_1$, the field of which is fed with D. C. This motor $SM'_1$, which is controlled by $T'_1$ and thereby by the planet pinions of the differential D, controls mechanically through the gearwork 48 the set 20 of brushes 18, 19. The working of this device is identical with that of Fig. 1; only the connection between 45 and 20 is different and is provided electrically instead of mechanically.

Figure 3:
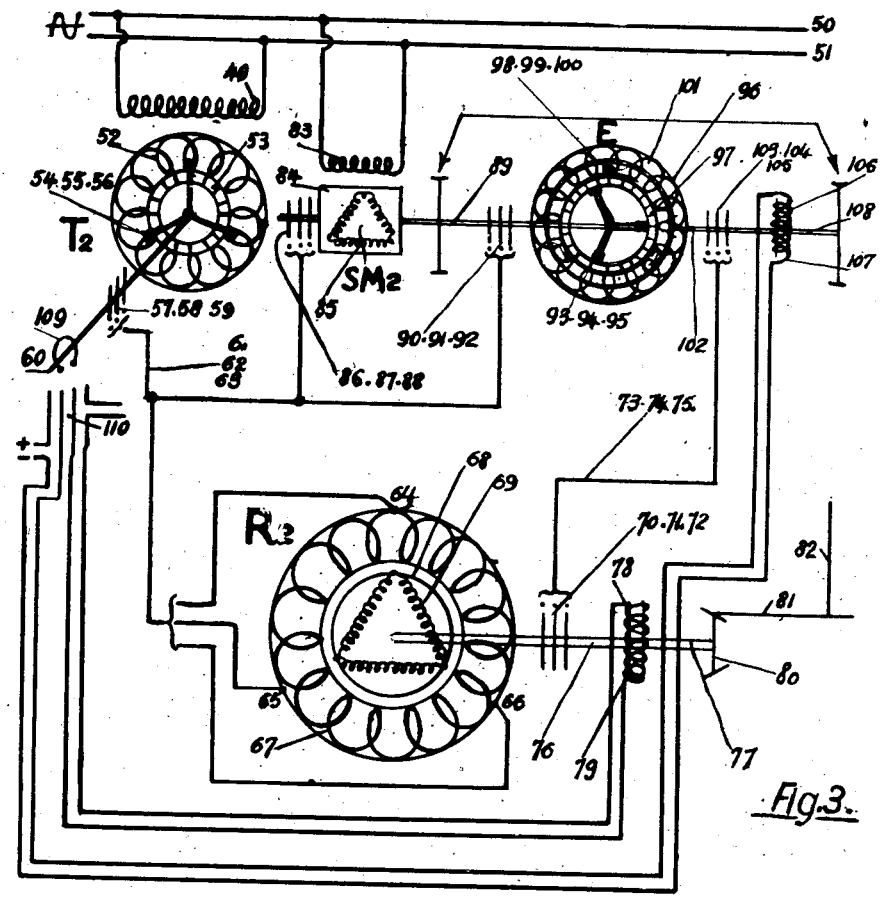
Fig. 3 is a diagram of another form of execution of the invention comprising a frequency changer.

In the form of execution shown on Fig. 3, the transmitter $T_2$ comprises a field winding 49 fed from the wires 50 51 of the one-phase mains for instance and an armature winding 52 the coils of which are connected with a commutator 53 over which rubs a set of three movable brushes 54, 55, 56 controlled by the controlling part through the shaft 60. The current of the distant control device collected by the brushes 54, 55, 56 passes through the three rings 57, 58, 59 and the connecting wires 61, 62, 63; this three-phase current feeds the stator winding 67, of the receiver $R_2$ through three equidistant points 64, 65, 66. The rotor 68 of the receiver $R_2$ comprises a three-phase winding 69 connected through the rings 70, 71, 72 with the connecting wires 73, 74, 75 fed, if required with a modification in frequency as explained hereinafter, by the distant control wires 61, 62, 63.

The shaft 76 of the rotor of the receiver $R_2$ controls the controlled part through an electromagnetic clutch 78 excited by the winding 79 the circuit of which is controlled by the contact stop 109 controlled by the controlling part. This electromagnetic clutch controls in its turn the shaft 77 which drives the controlled part through the bevel gear wheels 80, 81 and the shaft 82. The field winding 83 of the auxiliary motor $SM_2$ is fed as precedently from the mains and the distant control transmission 61, 62, 63 feeds the three phase rotor winding 85 through the rings 86, 87, 88. The rotor of the auxiliary motor drives through its shaft 89 the set of movable brushes 93, 94, 95 rubbing on the commutator 97 of the frequency changer E, the segments of the commutator 97 being connected with the coils of the windings 96 of the said frequency changer. The brushes 93, 94, 95 are also fed by the distant control current through the rings 90, 91, 92. This distant control current is transmitted as stated hereinabove to the wires 73, 74, 75 feeding the rotor of the receiver $R_2$ through a second set 101 of brushes 98, 99, 100 disposed round the same commutator. These normally stationary brushes are connected with the wires 73, 74, 75 through the rings 103, 104, 105. The shaft 102 controlling the set 101 can be controlled by the auxiliary motor $SM_2$ through a mechanical transmission shown diagrammatically, the shaft 108 and the electromagnetic clutch 106 excited by the winding 107 also controlled by the contact stop 109 under the action of the controlling part.

This device works in the following manner: The circuit of the winding 79 of the clutch 78 corresponding to the controlled part is closed as in the precedent case when the controlling part is in front of its stop 109; on the contrary the winding 107 of the clutch 106 corresponding to the frequency changer is open at this moment and is closed only when the controlling part has passed beyond the contact 109.

When the controlling part 60 stops, the receiver and auxiliary motor also stop, and consequently also the controlled part. When the controlling part moves inside the zone corresponding to the allowed movement of the controlled part, the auxiliary motor rotates and drives the set of movable brushes 93, 94, 95 of the frequency changer; thereby the brushes 98, 99, 100 being stationary, the frequency changer brings the potentials of these brushes to a constant value. The field produced by the winding 69 is thereby stationary in space, that of winding 67 rotating of course under the action of the current fed directly from the brushes 57, 58, 59. Consequently the receiver $R_2$ remains controlled by the transmitter $T_2$ and drives the controlled part through the clutch 78.

On the contrary when the controlling part has passed beyond its stop 109, the auxiliary motor makes the brushes 98, 99, 100 rotate through the clutch 106. Consequently the two sets of brushes of the frequency changer rotate at the same speed and the current at 73, 74, 75 cannot show any difference with that feeding the winding 67; the two fields of the receiver rotate at the same speed; the receiver remains therefore motionless once the two fields are in equilibrium one with the other, the controlled part being besides disconnected at this moment. The receiver will remain motionless as long as the controlling part has not returned in front of the stop 109.

Fig. 4 shows a distant control nearly similar to that of Fig. 3 except as concerns the frequency changer replaced as will be explained by a secondary transmitter producing directly the current necessary for feeding the receiver rotor.

The transmitter $T_3$ comprises a field winding 111 connected with the one-phase mains 112—113 and an armature the coils 114 of which are connected with the segments of the commutator 115 round which moves the set of movable brushes 116, 117, 118; this set of movable brushes is driven by the controlling part through the shaft 122 which controls also the contact stop 163 which may close the circuit of the windings 144 and 156 of the two electromagnetic clutches, 143 and 155 to be described hereinafter. The current collected by the brushes 116, 117, 118 feeds the windings 129 of the receiver stator $R_3$ through the rings 119, 120, 121, the transmission 122, 123, 124 and the equidistant points 126, 127, 128. The winding 131 of the rotor 130 of the receiver is fed through the rings 132, 133, 134 and the wires 135, 136, 137 receiving the current produced by the secondary transmitter $T_4$. The shaft 138 of the receiver motor controls the shaft 139 of the controlled part through the electromagnetic clutch 143 excited by the winding 144 and the bevel pinions 141, 142.

The auxiliary motor $SM_3$ comprises as precedently the windings 143 connected as a shunt with the one-phase mains and the rotor 146 fed from the distant control wires 123, 124, 125 through the rings 147, 148, 149. The shaft 150 of this auxiliary motor can control through the electromagnetic clutch 155 excited by the winding 156 the normally stationary brushes 152, 153, 154 rubbing on the commutator 162 of the secondary transmitter $T_4$. The segments of this commutator are connected with the coils of the armature 161 of $T_4$, the field 160 being in shunt with the one-phase mains. This transmitter armature sends into the wires 135, 136, 137 feeding the rotor of the receiver $R_3$ a three phase current collected by the brushes 152, 153, 154 and the rings 157, 158, 159.

The device of Fig. 4 works in the following manner, the electromagnetic clutches being excited as in the case of Fig. 3.

When the controlling part is stationary, the auxiliary motor $SM_3$ and the receiver $R_3$ are also stationary.

When the controlling part moves in the zone corresponding to the allowed displacement of the controlled part, the auxiliary motor $SM_3$ starts rotating and remains controlled by it but has no action on the transmitter $T_4$ as the clutch 155 is open; thereby the transmitter $T_4$ sends into the rotor of the receiver $R_3$ a three-phase current producing a field stationary in space. Consequently, the winding 128 producing a rotating field, the receiver starts rotating and drives the controlled part through the excited clutch 143.

On the contrary when the controlling part has passed beyond the contact 163, the clutch 143 will be open and the clutch 156 closed. Therefore the auxiliary motor will actuate the set of movable brushes of the transmitter $T_4$ which will send into the rotor of the receiver $R_3$ a three phase current producing a field rotating at the same speed as that produced by the winding 129, as the transmitters $T_3$ and $T_4$ move synchronously. Thereby the receiver $R_3$ will remain stationary and is moreover disconnected mechanically from the controlled part. The receiver will restart and the controlled part be reconnected with it only when the controlling part will have returned in front of the contact 163.

What I claim is:

1. In a distant control device comprising a controlling part, a transmitter actuated thereby, a two-winding receiver controlled by the transmitter and a controlled part actuated by the receiver, the combination of a circuit, a contact inserted therein disposed in the path of the controlling part and adapted to be controlled by the latter, means whereby the transmitter feeds one winding of the receiver with current producing a rotating field, means for feeding the second winding with current producing a stationary field and means controlled by the circuit and adapted to make the latter field rotate at the same speed as the former field.

2. In a distant control device comprising a controlling part, a transmitter actuated thereby, a two-winding receiver controlled by the transmitter and a controlled part actuated by the receiver, the combination of a circuit, a contact inserted therein disposed in the path of the controlling part and adapted to be controlled by the latter, means whereby the transmitter feeds one winding of the receiver with current producing a rotating field, means for feeding the second winding with current producing a stationary field, an electromagnetic clutch inserted in the circuit and means whereby the said clutch makes the latter field rotate at the same speed as the former field and stop it according to its state of excitation.

3. In a distant control device comprising a controlling part, a transmitter actuated thereby, a two-winding receiver controlled by the transmitter and a controlled part actuated by the receiver, the combination of a circuit, a contact inserted therein disposed in the path of the controlling part and adapted to be controlled by the latter, means whereby the transmitter feeds one winding of the receiver with current producing a rotating field, means for feeding the second winding with current producing a stationary field, an electromagnetic clutch inserted in the circuit, means whereby the said clutch makes the latter field rotate at the same speed as the former field and stops it according to its state of excitation, and a second electromagnetic clutch inserted in parallel with the first one and adapted to connect and disconnect the receiver and the controlled part according to its state of excitation.

4. In a distant control device comprising a controlling part, a transmitter actuated thereby, a two winding receiver controlled by the transmitter and a controlled part actuated by the receiver, the combination of a circuit, a contact inserted therein disposed in the path of the controlling part and adapted to be controlled by the latter, means whereby the transmitter feeds one winding of the receiver with current producing a rotating field, a set of brushes for feeding the second winding with current producing a stationary field, an auxiliary receiver rotating at the same speed as the rotating field and an electromagnetic clutch inserted in the circuit and adapted to connect when excited the auxiliary receiver and the set of brushes.

5. In a distant control device comprising a controlling part, a transmitter actuated thereby, a two winding receiver controlled by the transmitter and a controlled part actuated by the receiver, the combination of a circuit, a contact inserted therein disposed in the path of the controlling part and adapted to be controlled by the latter, means whereby the transmitter feeds one winding of the receiver with current producing a rotating field, a set of brushes for feeding the second winding with current producing a stationary field, an intermediary receiver controlled by the transmitter an auxiliary distant control device controlled by said intermediary receiver, an auxiliary receiver for said auxiliary control device and an electromagnetic clutch inserted in the circuit and adapted to connect when excited the auxiliary receiver and the set of brushes and to make the latter move at the same speed as the rotating field.

6. In a distant control device comprising a controlling part, a transmitter actuated thereby, a two winding receiver controlled by the transmitter and a controlled part actuated by the receiver, the combination of a circuit, a contact inserted therein disposed in the path of the controlling part and adapted to be controlled by the latter, means whereby the transmitter feeds one winding of the receiver with current producing a rotating field, an auxiliary receiving motor, controlled by the transmitter, an electromagnetic clutch inserted in the circuit, a closed stationary winding, a commutator for latter winding, a set of rotatable brushes rubbing on said commutator and adapted to be connected through the clutch with the auxiliary receiving motor, wires connecting the said brushes with equidistant points on the second winding of the receiver and means for giving the several points of the stationary winding potentials which are constant or vary at the frequency of the current in the transmitter according to the operating state of the clutch.

In testimony whereof I have signed my name to this specification.

ELIE GRANAT.